United States Patent
Hochwald et al.

(10) Patent No.: US 9,178,597 B2
(45) Date of Patent: Nov. 3, 2015

(54) METHOD OF UPDATING TRANSMISSION CHANNEL INFORMATION BASED ON EAVES-DROPPING OF BEAMFORMED SIGNALS

(75) Inventors: Bertrand Hochwald, Santa Clara, CA (US); Harold Artes, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 842 days.

(21) Appl. No.: 12/072,375

(22) Filed: Feb. 26, 2008

(65) Prior Publication Data
US 2009/0190520 A1 Jul. 30, 2009

Related U.S. Application Data

(60) Provisional application No. 61/062,629, filed on Jan. 28, 2008.

(51) Int. Cl.
| H04B 7/06 | (2006.01) |
| H04B 7/04 | (2006.01) |
| H04W 72/08 | (2009.01) |

(52) U.S. Cl.
CPC ............ *H04B 7/0689* (2013.01); *H04B 7/0617* (2013.01); *H04B 7/0413* (2013.01); *H04B 7/0619* (2013.01); *H04B 7/0671* (2013.01); *H04B 7/0697* (2013.01); *H04W 72/08* (2013.01)

(58) Field of Classification Search
USPC ......................................................... 370/315
See application file for complete search history.

(56) References Cited

U.S. PATENT DOCUMENTS

| 6,853,839 | B2 * | 2/2005 | Usuda et al. ................... 370/342 |
| 6,922,445 | B1 * | 7/2005 | Sampath et al. ............... 455/132 |
| 6,937,592 | B1 * | 8/2005 | Heath et al. .................... 370/342 |
| 7,586,873 | B2 * | 9/2009 | Heath et al. .................... 370/342 |
| 7,843,887 | B2 * | 11/2010 | Haga et al. ..................... 370/332 |
| 8,259,672 | B2 | 9/2012 | Hochwald et al. |
| 2003/0012308 | A1 | 1/2003 | Sampath et al. |
| 2003/0076782 | A1 * | 4/2003 | Fortin et al. ................. 370/230.1 |
| 2003/0103477 | A1 * | 6/2003 | Doi et al. ....................... 370/334 |
| 2004/0052228 | A1 * | 3/2004 | Tellado et al. ................. 370/334 |
| 2004/0120259 | A1 * | 6/2004 | Jones et al. .................... 370/250 |
| 2005/0117543 | A1 * | 6/2005 | Heath et al. .................... 370/329 |
| 2005/0147066 | A1 * | 7/2005 | Jechoux et al. ............... 370/335 |
| 2005/0207367 | A1 * | 9/2005 | Onggosanusi et al. ........ 370/315 |
| 2006/0067277 | A1 * | 3/2006 | Thomas et al. ............... 370/334 |
| 2006/0068703 | A1 * | 3/2006 | Ng et al. ....................... 455/41.2 |
| 2006/0153060 | A1 * | 7/2006 | Cho .............................. 370/208 |

(Continued)

OTHER PUBLICATIONS

P. Viswanath, D. Tse, and R. Laroia, "Opportunistic Beamforming Using Dumb Antennas," IEEE Trans. Info. Th., vol. 48, pp. 1277-1294, Jun. 2002.

(Continued)

*Primary Examiner* — Jenee Williams
(74) *Attorney, Agent, or Firm* — Sterne, Kessler, Goldstein & Fox P.L.L.C.

(57) ABSTRACT

A method and apparatus of providing a base station with updated transmission channel information is disclosed. The method includes the base station transmitting beamformed signals to a first terminal. A second terminal receives the transmitted beamformed signals, and measures a signal quality. The second terminal conveys back to the base station the measured signal quality, and a transmission identifier of the beamformed data signal.

24 Claims, 7 Drawing Sheets

(56) References Cited

U.S. PATENT DOCUMENTS

| | | |
|---|---|---|
| 2006/0268776 A1* | 11/2006 | Ko et al. .................. 370/329 |
| 2007/0008943 A1* | 1/2007 | Grant et al. ............... 370/342 |
| 2007/0076653 A1* | 4/2007 | Park et al. ................. 370/328 |
| 2007/0153922 A1 | 7/2007 | Dong et al. |
| 2007/0274197 A1* | 11/2007 | Thomas et al. ........... 370/201 |
| 2007/0274256 A1* | 11/2007 | Murai et al. .............. 370/328 |
| 2008/0008110 A1* | 1/2008 | Kishigami et al. ........ 370/310 |
| 2008/0037464 A1* | 2/2008 | Lim et al. ................. 370/329 |
| 2008/0069251 A1* | 3/2008 | Imai et al. ................. 375/260 |
| 2008/0080634 A1* | 4/2008 | Kotecha et al. ........... 375/267 |
| 2008/0188192 A1* | 8/2008 | Chae et al. ................ 455/129 |
| 2008/0207135 A1 | 8/2008 | Varadarajan et al. |
| 2008/0219370 A1* | 9/2008 | Onggosanusi et al. .... 375/260 |
| 2008/0304658 A1* | 12/2008 | Yuda et al. ................ 380/44 |
| 2008/0311891 A1* | 12/2008 | Venkatachalam et al. . 455/414.1 |
| 2009/0022049 A1* | 1/2009 | Zeng ......................... 370/203 |
| 2009/0028262 A1* | 1/2009 | Imai et al. ................. 375/267 |
| 2009/0268668 A1* | 10/2009 | Tinnakornsrisuphap et al. ......................... 370/328 |
| 2010/0061317 A1* | 3/2010 | Gorokhov et al. ........ 370/329 |
| 2010/0232345 A1 | 9/2010 | Tsai et al. |
| 2012/0327805 A1 | 12/2012 | Hochwald et al. |
| 2013/0114429 A1* | 5/2013 | Jonsson et al. ............ 370/252 |

OTHER PUBLICATIONS

M. Sharif and B. Hassibi, "On the Capacity of MIMO Broadcast Channels with Partial Side Information," IEEE Trans. Info. Th., vol. 51, pp. 506-522, Feb. 2005.

802.16e Technical Working Group, *IEEE Standard for Local and Metropolitan Area Networks, etworks' Part 16: Air Interface for Fixed and Mobile Broadband Wireless Access Systems* . New York: IEEE, 2006; 864 pages.

\* cited by examiner

A base station downlink transmitting beamformed signals to a plurality of terminals, the beam formed signals directed and conveying data to each of the plurality of terminals, each beamformed signal directed to each of the plurality of terminals being spatially orthogonal to the other beamformed signals directed to other terminals

610

A second terminal receiving the downlink transmitted beamformed signals, and measuring a signal quality

620

The second terminal estimating downlink channel information based on the measured signal quality

630

The second terminal conveying back to the base station the downlink channel information

The terminal receiving downlink transmitted beamformed signals, and measuring a signal quality, wherein the downlink transmitting beamformed signals are transmitted from a base station to a plurality of terminals, the beam formed signals directed and conveying data to each of the plurality of terminals, each beamformed signal directed to each of the plurality of terminals being spatially orthogonal to the other beamformed signals directed to other terminals

710

The terminal estimating downlink channel information based on the measured signal quality

720

The terminal conveying the downlink channel information back to the base station

METHOD OF UPDATING TRANSMISSION CHANNEL INFORMATION BASED ON EAVES-DROPPING OF BEAMFORMED SIGNALS

CROSS-REFERENCE TO RELATED APPLICATION

This application claims the benefit of U.S. Provisional Application Patent Application No. 61/062,629 filed Jan. 28, 2008 which is incorporated by reference in its entirety herein.

FIELD OF THE DESCRIBED EMBODIMENTS

The described embodiments relate generally to wireless communications. More particularly, the described embodiments relate to a method and system for updating transmission channel information based on eaves-dropping of beamformed signals.

BACKGROUND

Mobile WiMAX is a wireless platform being developed to provide wireless access that is able to deliver on demanding service requirements. With the added support for a variety of advanced multi-antenna implementations, Mobile WiMAX offers wireless access that meets growing network demands with higher performance, fewer sites, less spectrum, and reduced cost.

Multiple antenna techniques at the base station and end-user device, paired with sophisticated signal processing, can dramatically improve the communications link for the most demanding application scenarios including heavily obstructed propagation environments and high speed mobility service. Where conventional wireless network design has long used base site sectorization and single, omni-directional antennas at the end-user device to serve the communications link, with advanced multi-antenna implementations operators have a new techniques to develop the robust wireless networks.

Industry vendors and sources have created a host of naming conventions to refer to multi-antenna implementations. Simply put, the term MIMO (multiple input multiple output) can be used to reference any multi-antenna technologies. MIMO antenna systems are used in code division multiple access (CDMA) networks, time division multiplexing (TDM) networks, time division multiple access (TDMA) networks, orthogonal frequency division multiplexing (OFDM) networks, orthogonal frequency division multiple access (OFDMA) networks, and others. In order to maximize throughput, MIMO networks use a variety of channel estimation techniques to measure the transmission channel between a base stations of the wireless network and a mobile device. The channel estimation technique used depends on the wireless network type (i.e., CDMA, TDM/TDMA, OFDM/OFDMA).

Methods of estimating the transmission channels rely on pilots that occupy valuable time and frequency transmission space. That is, the typical methods require dedicated signaling overhead which that requires bandwidth (time and/or frequency), and therefore, reduces system capacity.

Additionally, wireless networks that include mobile terminals (subscribers) have transmission channels that change frequently. Therefore, the transmission channels must be re-estimated or updated more frequently. As a result, wireless networks that include mobile terminals require even more capacity dedicated to channel estimations.

It is desirable to have a system and method for estimating and/or updating transmission channel information between a base station and a mobile terminal of a wireless network, that reduces the amount of time and frequency channel capacity required for the pilots.

SUMMARY

An embodiment includes a method of aiding downlink transmission. The method includes a base station downlink transmitting beamformed signals to at least a first terminal, the beam formed signals directed and conveying data to at least the first terminal. A second terminal eaves-drops the transmitted beamformed signals, and measures signal qualities. The second terminal estimates downlink channel information based on the measured signal quality. The base station can use the measured signal qualities or the estimated channel information to estimate or update an estimated downlink channel between base station and the second terminal.

Another embodiment includes a method of aiding downlink transmission. The method includes a base station downlink transmitting beamformed signals to a plurality of terminals. The beam formed signals are directed and convey data to each of the plurality of terminals. Each beamformed signal directed to each of the plurality of terminals is spatially orthogonal to the other beamformed signals directed to other terminals. A second terminal receives the downlink transmitted beamformed signals, and measures a signal quality. The second terminal estimates downlink channel information based on the measured signal quality, and conveys the estimates downlink channel information back to the base station.

Another embodiment includes a method of a terminal aiding downlink transmission. The method includes the terminal receiving downlink transmitted beamformed signals, and measuring a signal quality. The received downlink beamformed signals are transmitted from a base station to a plurality of terminals, and the beam formed signals are directed and convey data to each of the plurality of terminals. Each beamformed signal directed to each of the plurality of terminals is spatially orthogonal to the other beamformed signals directed to other terminals. The second terminal obtains downlink channel information based on the measured signal quality. The second terminal conveys the downlink channel information back to the base station.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 6 is a flow chart that includes steps of one other example of a method of providing a base station with transmission channel information.

FIG. 7 is a flow chart that includes steps of one example of a method of a terminal aiding downlink transmission.

DETAILED DESCRIPTION

Methods and apparatuses for updating transmission channel information based on eaves-dropping of beamformed signals are disclosed. Terminals (subscribers) of a wireless network eaves-drop beam formed signals directed from a base station to other terminals. The eaves-dropping terminals measure at least one signal quality of the eaves-dropped signals. Based upon the measured signal qualities, estimates of a transmission channel between the base station and the eaves-dropping terminal can be generated and/or updated.

It is to be understood that for the descriptions of the embodiments, the term "eavesdropping" is not intended to be a derogatory term. A terminal that is eaves dropping, is receiving data and/or pilot signals that are directed (generally, through beamforming) to a different terminal. In the described embodiments, an eavesdropping terminal acts benignly and is not necessarily interested in the decoding the scheduled data intended for another terminal. The eavesdropping terminal instead takes advantage of a situation that includes a base station transmitting signals to other terminals, to learn, obtain, or estimate information about a transmission channel between the base station and itself. This information can be fed back to the base station, enabling the base station to improve channel estimations to the eaves dropping terminal. The intention is that the eavesdropping terminal is scheduled at another time for data transmission or reception based on the channel information obtained during eavesdropping. At that point, the original terminals receiving data can become eavesdroppers, and so on.

Figure 1:
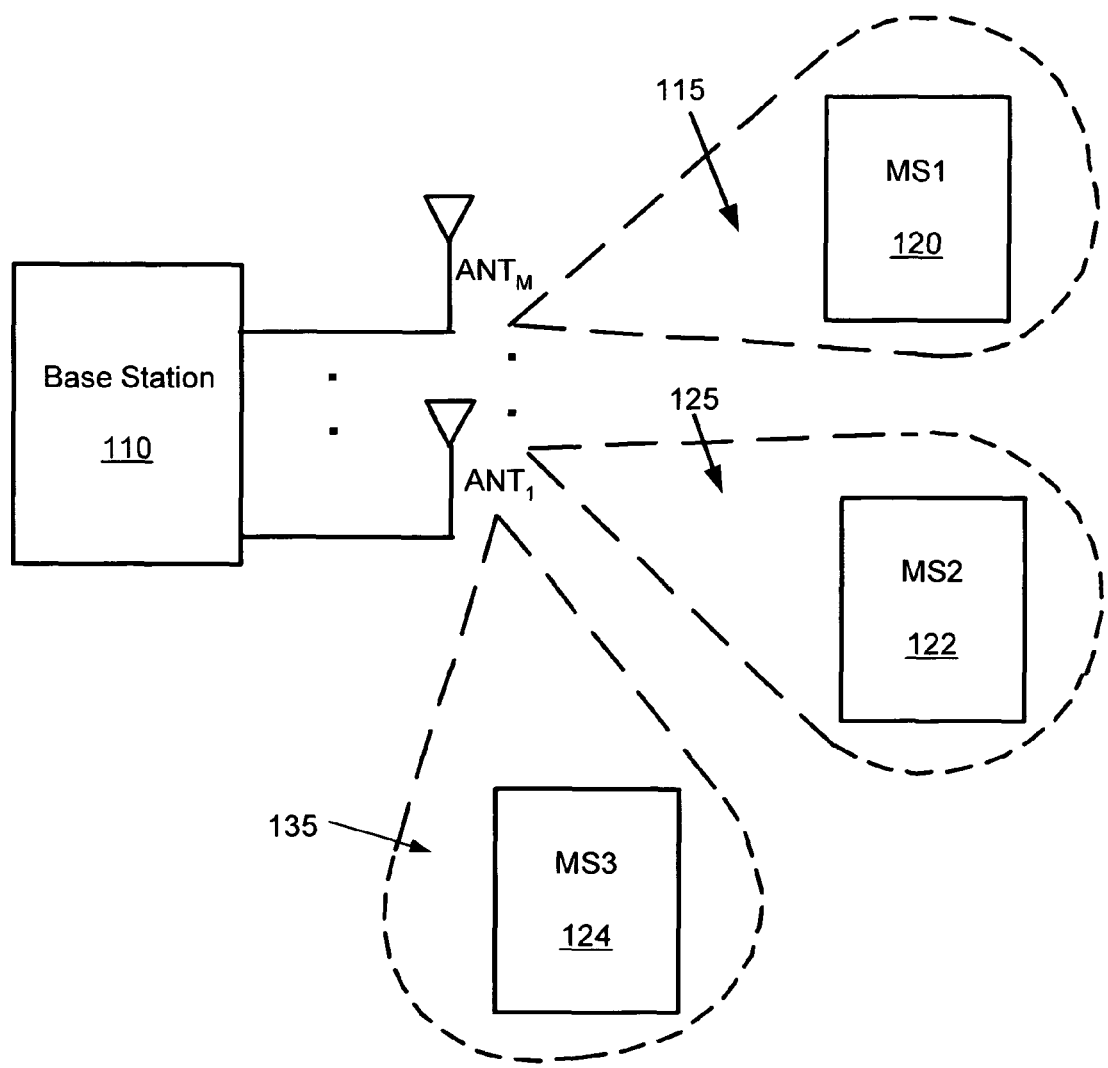
FIG. 1 shows an example of a base station transmitting beamformed signals to multiple user devices.

FIG. 1 shows an example of a base station 110 transmitting beamformed signals to multiple user devices 120, 122, 124. The base station 110 and user devices 120, 122, 124 can be a part of a wireless network, for example, a WiMax wireless network. To capitalize on the performance advantages offered by MIMO wireless systems, the wireless network can include MIMO communication diversity, MIMO spatial multiplexing and/or beamforming.

MIMO communication diversity includes a single data stream being replicated and transmitted over multiple antennas. For example, the redundant data streams can each be encoded using a mathematical algorithm known as Space Time Block Codes. With this example of coding, each transmitted signal is orthogonal to the rest reducing self-interference and improving the capability of the receiver to distinguish between the multiple signals. With the multiple transmissions of the coded data stream, there is increased opportunity for the receiver to identify a strong signal that is less adversely affected by the physical path. The receiver additionally can use Maximal-Ratio Combining (MRC) techniques to combine the multiple signals for more robust reception. MIMO communication diversity is fundamentally used to enhance system coverage.

MIMO spatial multiplexing includes the signal to be transmitted being split into multiple data streams and each data stream is transmitted from a different base station transmit antenna operating in the same time-frequency resource allocated for the receiver. In the presence of a multipath environment, the multiple signals will arrive at the receiver antenna array with sufficiently different spatial signatures allowing the receiver to readily discern the multiple data streams. Spatial multiplexing provides a very capable means for increasing the channel capacity.

Wireless networks can also include adaptive mode selection between MIMO communication diversity and MIMO spatial multiplexing. In environments where the Signal to Noise Ratio (SNR) is low, such as the edge of the cell or where the signal is weak, MIMO communication diversity may outperform MIMO spatial multiplexing. At higher SNR, where the system is more prone to be bandwidth limited rather than signal strength limited, MIMO spatial multiplexing may outperform MIMO communication diversity. An ideal WiMAX system employing MIMO techniques supports both. The system calculates an optimal switching point and dynamically shift between the two approaches to offer the necessary coverage or capacity gains demanded from the network at any given time or location.

Wireless network systems, such as, WiMAX systems, can also use beamforming as a means to further increase system coverage and capacity can surpass the capabilities of MIMO techniques. Beamforming techniques such as Statistical Eigen Beamforming (EBF) and Maximum Ratio Transmission (MRT) are optional features in the 802.16e WiMAX standard, but some vendors are taking advantage of its strong performance characteristics.

Beamforming techniques leverage arrays of transmit and receive antennas to control the directionality and shape of the radiation pattern. The antenna elements have spatial separation dictated by the wavelength of transmission and are supported by signal processing.

Channel information can be communicated from the WiMAX subscriber to the WiMAX base station using the uplink sounding response. Based on the understanding of the channel characteristics, the WiMAX base station utilizes signal processing techniques to calculate weights to be assigned to each transmitter controlling the phase and relative amplitude of the signals. By leveraging constructive and destructive interference, the radiation pattern is steered and formed to provide an optimal radiation pattern focused in the direction of communication.

When transmitting a signal, beamforming can increase the power in the direction the signal is to be sent. When receiving a signal, beamforming can increase the receiver sensitivity in the direction of the wanted signals and decrease the sensitivity in the direction of interference and noise.

Beamforming techniques allow the WiMAX system to realize increased range with higher antenna gain in the desired direction of communications and better connectivity between the base station and device. Simultaneously, the narrower beamwidth and reduced interference increases the capacity and throughput offered by the system.

Estimated transmission channel information is needed for proper selection between beamforming and/or spatial multiplexing transmission. As previously described, the channel information for mobile networks changes more rapidly than for static networks, and therefore, the channel information needs to be updated more frequently.

In OFDM-MIMO systems, training sequence design as well as efficient channel estimation algorithm remains a challenge if different training sequence signals are transmitted from different antennas simultaneously. Several approaches based on training tones have been attempted in prior art systems. Other known solutions of a time orthogonal preamble scheme can be implemented, but typically increase the overhead.

Figure 2:
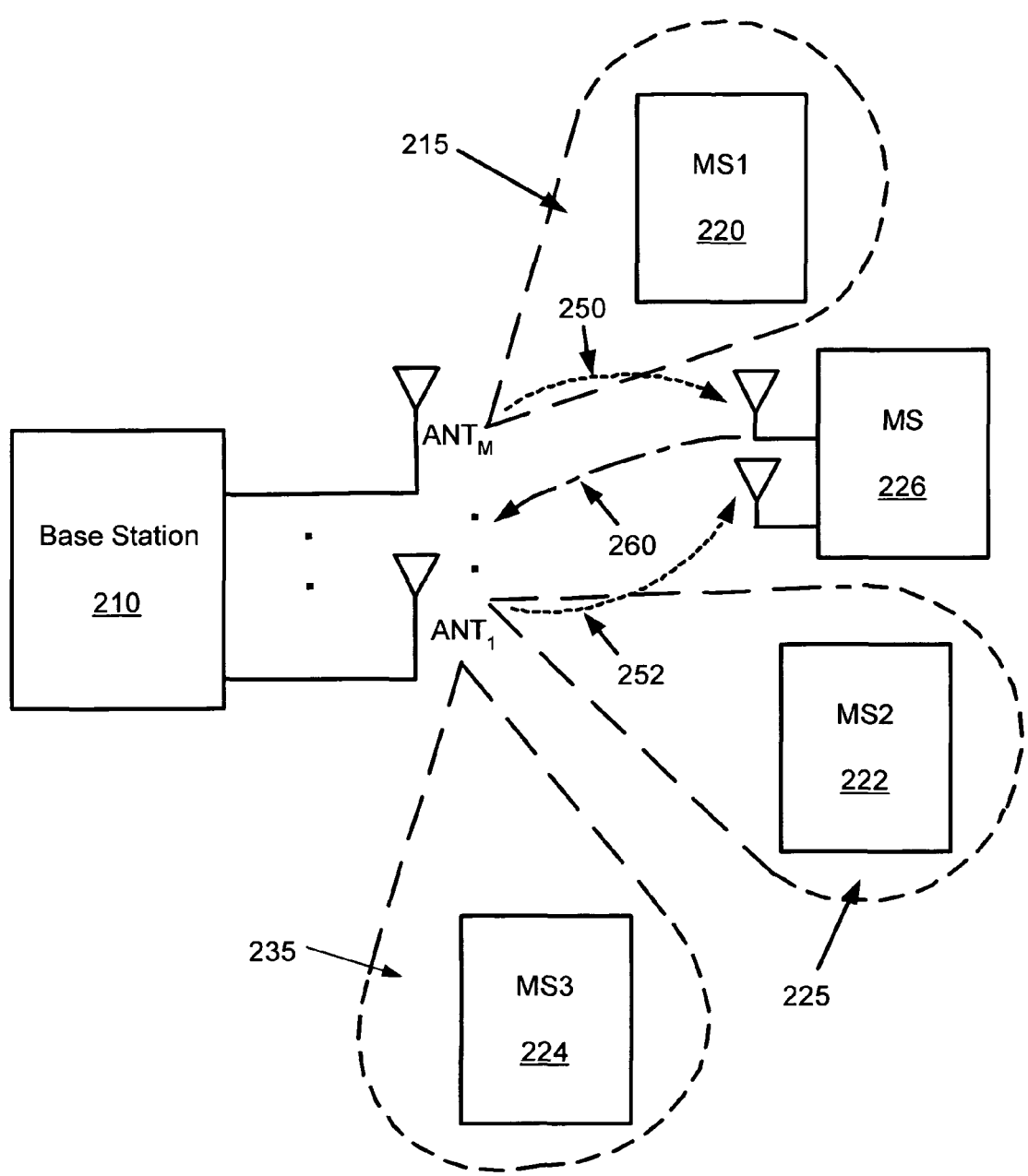
FIG. 2 shows an example of a base station transmitting beamformed signals to multiple user devices, and an eaves-dropping terminal receiving at least some of the beamformed signals.

FIG. 2 shows an example of a base station 210 transmitting beamformed signals to multiple user devices 220, 222, 224, and a second terminal 226 receiving at least some of the beamformed signals. For this example, the beamformed signals are intended for the user devices 220, 222, 224. For an embodiment, each beamformed signal for each user device is formed to be orthogonal to the beamformed signals for the other devices.

As shown, the second terminal 226 eaves-drops the beamformed signals (as shown by arrows 250, 252) that are directed to the other user devices 220, 222, 224. The beamformed signals are not directed to the second terminal 226. The base station 210 uses channel information between the base station 210 and the user devices 220, 222, 224 to form the beams. Based on knowledge of signal quality of signals eaves-dropped by the second terminal 226, the base station 210 can obtain some information about a transmission channel between the base station 210 and the second terminal 226. The base station 210 can obtain the signal quality from uplink transmission (shown by arrow 260) from the second terminal 226. That is, the second terminal measures the signal quality of the beamformed signals and feeds the signal quality measurements back to the base station 210. The base station can use this information to estimate the channel between the base station 210 and the second terminal 226, or supplement prior estimates of the channel between the base station 210 and the second terminal 226.

The base station 210 transmits beamformed signals to multiple user devices. That is, the base station 210 transmits multiple access signals that are received by multiple terminals, and that can be defined by at least frequency and time slots. As will be described, the multiple beam formed signals allocated to different users can also be spatially orthogonal, and/or include cyclic delay diversity. The signal quality measurements of the eaves-dropped signals need to have an identifier that allows the base station 210 to identify which beamformed signals transmitted by the base station 210 are being eaves-dropped, and resulted in the signal quality measurement.

One method of transmitting wireless signal, such as wireless transmission according to the WiMax protocol, includes multi-carrier symbols (such as OFDM) organized according to downlink and uplink frames. The frames include frequency carriers and time slots that can be used to identify the beamformed signals.

Figure 3:
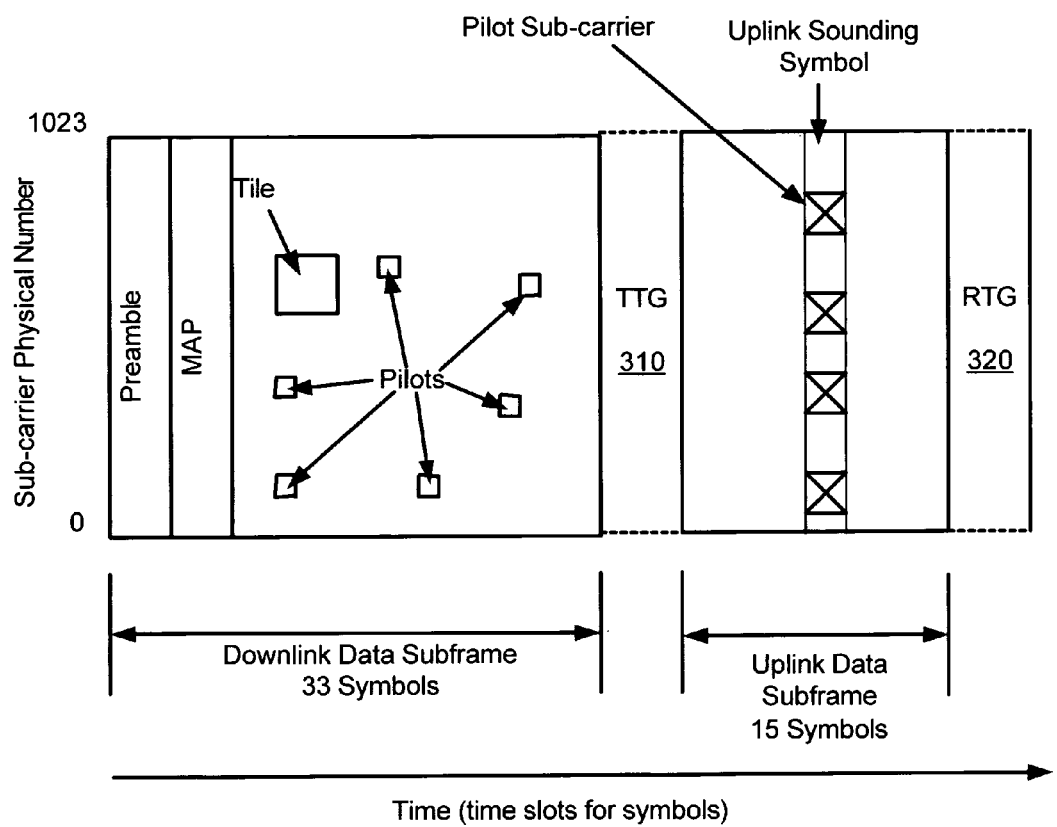
FIG. 3 shows an example of downlink and uplink frame that can be used for scheduled wireless communications.

FIG. 3 shows an example of downlink and uplink frame that can be used for scheduled wireless communications. The downlink frame and the uplink frame include sub-carriers (1024 sub-carriers are shown in FIG. 3) and time slots for OFDM symbols (33+15=48 symbols are shown in FIG. 3). The downlink frame includes a preamble and a MAP. A particular carrier frequency and a particular symbol can used to identify a tile within the downlink and/or uplink frames. The downlink includes pilot tones that are typically used to characterize a downlink channel between a base station and mobile terminal.

The uplink frame includes uplink sounding symbols (also referred to as pilot sub-carriers) that can be used to characterize an uplink channel between the mobile terminal and the base station. Guards TTG 310 and RTG 320 are included between the downlink and uplink frames.

The MAP includes a schedule of the downlink and uplink transmission. Based on the MAP, the mobile terminals can identify tile in which data and pilots are located. The MAP includes the previously discussed identifying information.

Figure 4:
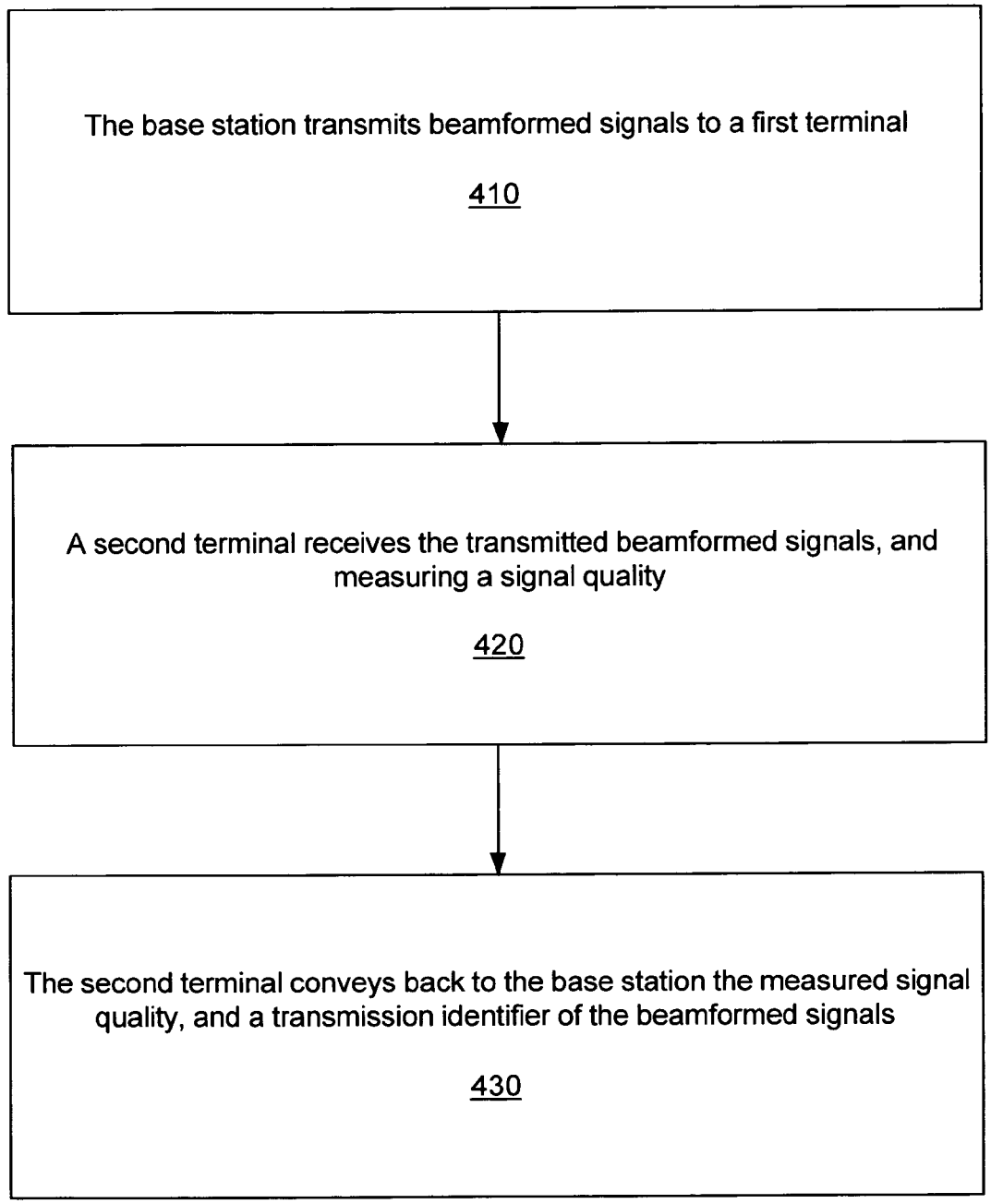
FIG. 4 shows a flow chart that includes steps of one example of a method of aiding downlink transmission.

FIG. 4 shows a flow chart that includes steps of one example of a method of providing a base station with updated transmission channel information. A first step 410 includes a base station downlink transmitting beamformed signals to at least a first terminal, the beam formed signals directed and conveying data to at least the first terminal. A second step 420 includes a second terminal eaves-dropping the transmitted beamformed signals, and measuring a signal quality. The beamformed signals are not directed to the second terminal. A third step 430 includes the second terminal estimating downlink channel information based on the measured signal quality.

The estimated downlink channel information can include the measured signal qualities of the received (eaves dropped) downlink beamformed signals. The measured signal qualities and/or downlink channel estimations can be feedback (conveyed) to the base station.

Based on the information conveyed back to the base station, the base station creates or updates channel information between the base station and the second terminal based on the measured signal qualities, and the transmission identifiers. That is, if the base station does not presently have information regarding the transmission channel between the base station and the second terminal, the base station can create the transmission channel information based on the measured signal qualities. If the base station does have information regarding the transmission channel, then the base station can update the existing channel information based on the measured signal qualities.

The beamformed signals can be data or pilot signals. That is, both data signals and pilot signals can be transmitted as beamformed signals. Therefore, it is possible for the eaves-dropping terminal to measure the signal quality of, and identify both data and pilot signals.

As described, the base station can transmit beam formed signals to multiple terminals. Therefore, the second terminal can receive the transmitted beamformed signals intended for multiple different terminals. The beamformed signals are not directed to the second terminal. The second (eaves-dropping) terminal measures corresponding signal qualities, and identifies which other terminal the beamformed signals were directed to. The downlink beamformed signals are typically transmitted to multiple terminals (which can include the eaves dropping terminal when not eaves dropping). The multiple access downlink transmission can include TDMA, FDMA, and/or CDMA. Additionally, the beam formed signals transmitted to different terminals can be spatially orthogonal.

One embodiment includes the second terminal identifying beam forming transmission data signals that have a quality above a threshold, and another embodiment includes the second terminal identifying beam forming transmission data signals that have a quality below a threshold. With this information, the base station can identify which of the beamformed signals provided transmission signals to the second terminal above or below and signal quality threshold.

The measured signal quality provided by the second terminal needs to be associated with a transmission identifier so that the base station knows which transmission signals are associated with the measured signal quality. An embodiment of the identifier includes at least a frequency channel, a time slot and/or an intended terminal. For WiMAX implementations, the transmission identifier includes, for example, identification of a time-frequency tile within a WiMAX downlink frame.

An embodiment of the second terminal includes multiple antennas. For this embodiment the second terminal receives the transmitted beamformed signals over multiple receive antennas, and measures a joint signal quality indicator. The second terminal conveys back to the base station the joint signal quality indicator, and a transmission identifier of the beamformed signals corresponding with each of the joint signal quality indicators. For this embodiment, the transmission identifier can include at least one of an intended user, a carrier frequency, a symbol, or at least one of receive antennas. The base station can determine whether to transmit in a beamforming mode or a spatial multiplexing mode based on the joint signal quality indicator.

The base station (and/or the eaves dropping terminal) can select one of different modes based on the joint signal quality indicator. For one embodiment, the joint signal quality indicator includes a signal quality difference between the multiple receive antennas, and if the signal quality difference between the multiple receive antennas varies by greater than a threshold, then the base station (and/or the eaves dropping terminal) selects spatial multiplexing for transmission to the second terminal. If the signal quality difference between the multiple receive antennas varies by less than a threshold, then the base station selects beamforming for transmission to the second terminal.

One embodiment of the base station cyclic-delays the transmitted beamformed signals. This embodiment further includes the second terminal selecting frequency sub-carriers of the cyclic-delayed transmitted beamformed signals for reception based on a frequency dependency of the frequency sub-carriers of the cyclic-delayed transmitted beamformed signals.

Figure 5:
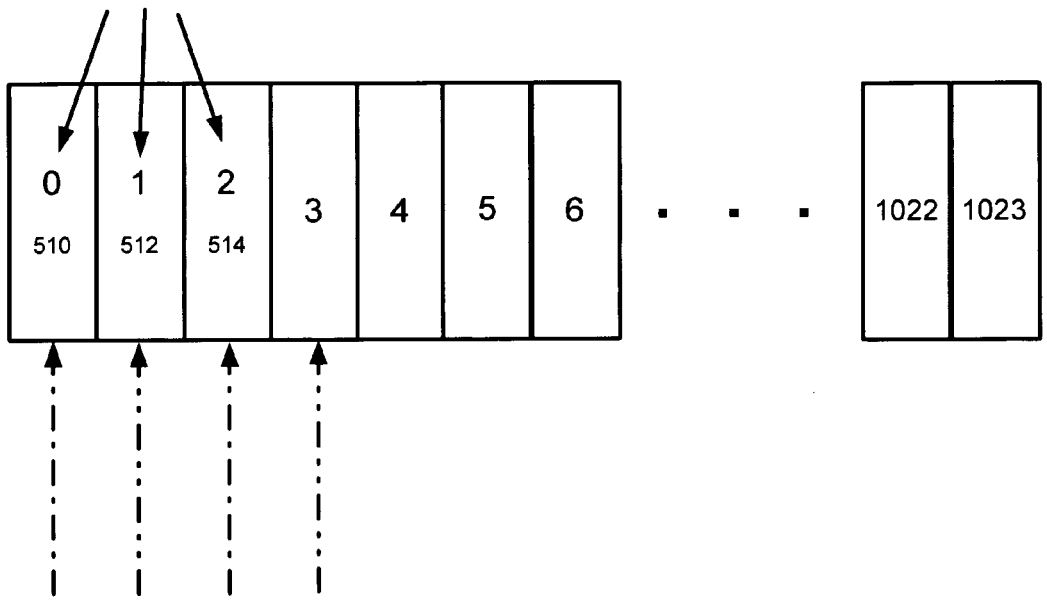
FIG. 5 shows a frequency spectrum of a downlink multi-carrier signal in which different sub-carriers of the multi-carrier signal are allocated to different terminals, and the downlink multi-carrier signal includes cyclic delay diversity.
Figure 5:
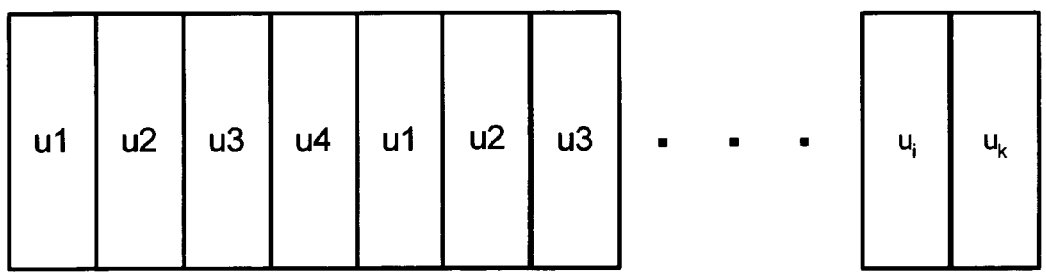

FIG. 5 shows a frequency spectrum of a downlink multi-carrier signal in which different sub-carriers of the multi-carrier signal are allocated to different terminals, and the downlink multi-carrier signal includes cyclic delay diversity. As shown, a first sub-carrier 510 is allocated to a first user U0, a second sub-carrier 512 is allocated to a second user U1, a third sub-carrier 514 is allocated to a third user U2 and a fourth sub-carrier is allocated to a fourth user U3.

An embodiment includes beamforming each sub-carrier of a multi-carrier OFDMA symbol directed to the terminals. The terminals may be assigned randomly or in specific patterns to subcarriers. Generally, M transmit antennas of the base station can support K terminals with spatially orthogonal beams $q_1, \ldots, q_K$, in which $K \leq M$. A terminal k can be assigned to subcarrier k with beam $q_k$ for $k=1, \ldots K$. Because the subcarriers in an OFDMA system are generally closely-spaced, it can be assumed that an eavesdropper has a frequency-flat channel response from the M basestation antennas to its receive antennas. This means that the channel does not vary significantly across the K subcarriers.

Assuming in this example that the terminal has only one receive antenna. Then the signal received by the eavesdropper on frequency k becomes:

$$y(k) = P(h^* q_k) d_k + n(k)$$

where:
$h^*$ represents the 1×M frequency-flat channel between the basestation and the eavesdropper,
$q_k$ represents the beam sent to terminal k, with $\|q_k\|=1$ (unit-norm beam),
$d_k$ represents the data or pilot signal sent to terminal k,
$n(k)$ is additive receiver noise at the eavesdropper,
P represents the transmission power of the basestation across all antennas.

Arranging the K measurements taken by the eavesdropper into a 1×K row-vector, yields:

$$y = h^* Q + n$$

where $Q = [q_1 \ldots q_K]$ is the M×K matrix of all the K terminal beams. The eavesdropper may relay all or parts of y to the basestation that knows Q and the base station can construct a beam for the eavesdropper. This embodiment is most effective if Q is a unitary (also sometimes called "orthogonal") matrix, meaning that the constituent beams are orthogonal to one another.

One possible way for the basestation to achieve orthogonality includes the basestation arranging the channel information for the intended beamformed K terminals into a matrix:

$$H = \begin{bmatrix} h_1^* \\ \vdots \\ h_K^* \end{bmatrix}$$

where $h_1^*, \ldots h_K^*$ represent the 1×M channels between the basestation and the K terminals. The matrix H therefore has dimension K×M. Rather than using the standard well-known unit-energy beams $q_k = h_k / \|h_k\|$ (which are not guaranteed to be orthogonal), the basestation forms the singular value decomposition:

$$H = USV^*$$

where U is a K×K unitary matrix, S is a K×K diagonal matrix with positive diagonal entries, and V* is an K×M matrix such that V*V=I (the identity matrix). The basestation then forms:

$$Q = VU^*$$

and chooses the K columns of Q as the unit-energy beams, one for each of the K terminals.

For the description here, Q can be referred to as an orthogonal set, and its columns can be used to generate spatially orthogonal beams. An embodiment includes the base station forming orthogonal beamformed signals by estimating a channel matrix, computing a singular value decomposition of the estimated channel matrix, computing an orthogonal set from the singular value decomposition, and generating spatially orthogonal beams by selecting columns of the orthogonal set.

Another way for a basestation to achieve orthogonality includes the basestation transmitting a combination of beamforming and cyclic-delay diversity, where the transmitted beam to the kth terminal is written as:

$$q_k(f) = \begin{bmatrix} q_{1k} \\ q_{2k} e^{2\pi j \tau_2 f} \\ \vdots \\ q_{Mk} e^{2\pi j \tau_M f} \end{bmatrix}$$

This beam has frequency-dependence given by the cyclic-delay parameters $\tau_2, \ldots \tau_M$, which generally have units of seconds (adopting the convention that $\tau_1 = 0$). The basestation may choose $|q_{1k}| = |q_{2k}| = \ldots |q_{Mk}|$ and the eavesdropping terminal can then generally find $f_1$ and $f_2$ such that $$q_k^*(f_1) q_k(f_2) = 0.$$

Therefore, the beams to terminal k are orthogonal at two different frequencies. With proper choice of the cyclic-delay parameters, the eavesdropper can find $f_1, \ldots f_M$ such that $q_k(f_1), \ldots q_k(f_M)$ are all orthogonal. Thus, the eavesdropper can use the beams at these frequencies for channel estimation.

FIG. 6 is a flow chart that includes steps of one example of a method of aiding downlink transmission. A first step 610 includes a base station downlink transmitting beamformed signals to a plurality of terminals, the beam formed signals directed and conveying data to each of the plurality of terminals, each beamformed signal directed to each of the plurality of terminals being spatially orthogonal to the other beamformed signals directed to other terminals. A second step 620 includes a second terminal receiving the downlink transmitted beamformed signals, and measuring a signal quality. A third step 630 includes the second terminal estimating downlink channel information based on the measured signal quality. A fourth step 640 includes the second terminal conveying back to the base station the downlink channel information.

FIG. 7 is a flow chart that includes steps of one example of a method of a terminal aiding downlink transmission. A first step 710 includes the terminal receiving downlink transmitted beamformed signals, and measuring a signal quality, wherein the downlink transmitting beamformed signals are transmitted from a base station to a plurality of terminals, the beam formed signals directed and conveying data to each of the plurality of terminals, each beamformed signal directed to each of the plurality of terminals being spatially orthogonal to the other beamformed signals directed to other terminals. A second step 720 includes the terminal estimating downlink channel information based on the measured signal quality. A third step 730 includes the terminal conveying the downlink channel information back to the base station.

Although specific embodiments of the invention have been described and illustrated, the invention is not to be limited to the specific forms or arrangements of parts so described and illustrated. The invention is limited only by the appended claims.

What is claimed:

1. A method of aiding downlink transmission between a base station and a first wireless terminal, comprising:
   beamforming, by the base station, a wireless signal to a second wireless terminal;
   receiving, by the base station, from the first wireless terminal, a measurement of the wireless signal beamformed by the base station to the second wireless terminal, wherein the measurement is performed by the first wireless terminal by eaves-dropping on the wireless signal; and
   estimating, by the base station, downlink channel information based on the measurement, the downlink channel information comprising a channel estimation of a downlink channel from the base station to the first wireless terminal.

2. The method of claim 1, wherein the estimated downlink channel information further comprises a transmission identifier of the wireless signal.

3. The method of claim 2, wherein the transmission identifier comprises at least a frequency channel, a time slot or an intended terminal.

4. The method of claim 2, further comprising identifying, by the first terminal, channels for transmitting uplink sounding based on the wireless signal and the transmission identifier of the wireless signal.

5. The method of claim 1, wherein the wireless signal comprises pilots.

6. The method of claim 1, further comprising:
   updating, by the base station, channel information between the base station and the first wireless terminal based on the estimated downlink channel information.

7. The method of claim 1, further comprising:
   updating, by the base station, the beamformed wireless signal based on the estimated downlink channel information.

8. The method of claim 1, further comprising:
   beamforming, by the base station, a second wireless signal to a third wireless terminal;
   receiving, by the base station, another measurement performed by the first wireless terminal on the second wireless signal; and
   estimating, by the base station, the downlink channel information based on the measurements of the wireless signal and the second wireless signal.

9. The method of claim 8, wherein the second wireless signal is cyclically-delayed by the base station.

10. The method of claim 8, wherein the second wireless signal is spatially orthogonal to other wireless signals directed to other terminals.

11. The method of claim 10, wherein the wireless signal is modified according to a spatially orthogonal signal selected from a column of an orthogonal set that is generated from a singular value decomposition of an estimated channel matrix.

12. The method of claim 1, further comprising comparing, by the first terminal, the measurement of the wireless signal to a threshold.

13. The method of claim 1, further comprising:
   receiving, by the first terminal, the wireless signal over multiple receive antennas, and measuring a joint signal quality indicator associated with using the multiple receive antennas; and
   conveying, by the first terminal, to the base station the joint signal quality indicator and a transmission identifier of the wireless signal.

14. The method of claim 13, wherein the transmission identifier comprises at least one of an intended terminal, a frequency channel, a symbol or at least one of the multiple receive antennas.

15. The method of claim 13, wherein the base station transmits to the first terminal in a beamforming mode or a spatial multiplexing mode based on the joint signal quality indicator.

16. The method of claim 15, wherein the joint signal quality indicator includes a signal quality difference between the multiple receive antennas, and if the signal quality difference between the multiple receive antennas varies by greater than a threshold, then the base station selects spatial multiplexing for transmission to the first terminal.

17. The method of claim 15, wherein the joint signal quality indicator includes a signal quality difference between the multiple receive antennas, and if the signal quality difference between the multiple receive antennas varies by less than a threshold, then the base station selects beamforming for transmission to the first terminal.

18. The method of claim 1, wherein the wireless signal is cyclically-delayed by the base station.

19. The method of claim 18, further comprising selecting, by the first terminal, frequency sub-carriers of the cyclically-delayed wireless signal for reception, wherein the selecting comprises using a frequency dependency of the frequency sub-carriers of the cyclically-delayed wireless signal.

20. A method of aiding downlink transmission between a base station and a first wireless terminal, comprising:
   measuring a wireless signal of a plurality of wireless signals directed to a plurality of wireless terminals, using the first wireless terminal, wherein the wireless signal is cyclically-delayed by the base station and is beamformed to a second wireless terminal of the plurality of wireless terminals, the wireless signal being spatially orthogonal to other wireless signals of the plurality of wireless signals, wherein the measuring of the wireless signal comprises eaves-dropping on the wireless signal; and estimating, by the first wireless terminal, downlink channel information based on the measured wireless signal;

conveying, from the first wireless terminal to the base station, the downlink channel information; and selecting, by the first wireless terminal, frequency sub-carriers of the wireless signal for reception, wherein the selecting comprises selecting based on a frequency dependency of the frequency sub-carriers of the cyclically-delayed wireless signal.

21. The method of claim 20, wherein the wireless signal is modified according to a spatially orthogonal signal selected from a column of an orthogonal set that is generated from a singular value decomposition of an estimated channel matrix.

22. A method of aiding downlink transmission between a base station and a first wireless terminal, comprising:

beamforming, by the base station, a first wireless signal to a second wireless terminal;

receiving, by the base station from the first wireless terminal, a measurement of the first wireless signal beamformed by the base station to the second wireless terminal, wherein the measurement is performed by the first wireless terminal by eaves-dropping on the first wireless signal;

estimating, by the base station, downlink channel information based on the measurement, the downlink channel information comprising a channel estimation of a downlink channel from the base station to the first wireless terminal; and beamforming, by the base station, a second wireless signal to the first wireless terminal, using the channel estimation.

23. The method of claim 22, wherein the wireless signal is cyclically-delayed by the base station, the method further comprising:

selecting, by the first terminal, frequency sub-carriers of the cyclically-delayed signal for reception, wherein the selection comprises using a frequency dependency of the frequency sub-carriers of the cyclically-delayed signal.

24. The method of claim 22, further comprising:

eavesdropping, by the first terminal, the first wireless signal using multiple receive antennas;

measuring, by the first terminal, a joint signal indicator associated with eavesdropping using the multiple receive antennas;

conveying, by the first terminal to the base station, the joint signal indicator; and transmitting, by the base station, to the first terminal in a beamforming mode or a spatial multiplexing mode based on the joint signal indicator.

* * * * *